United States Patent
Kadi

(10) Patent No.: US 7,725,511 B2
(45) Date of Patent: May 25, 2010

(54) BIO-METRIC INPUT MECHANISM

(75) Inventor: Zafer Kadi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1455 days.

(21) Appl. No.: 11/096,380

(22) Filed: Mar. 31, 2005

(65) Prior Publication Data

US 2006/0224645 A1 Oct. 5, 2006

(51) Int. Cl.
*G06F 3/02* (2006.01)

(52) U.S. Cl. ................................... 708/145
(58) Field of Classification Search .................. None
See application file for complete search history.

(56) References Cited

U.S. PATENT DOCUMENTS

| | | | | |
|---|---|---|---|---|
| 5,105,375 | A * | 4/1992 | Lapeyre | 708/146 |
| 5,993,089 | A * | 11/1999 | Burrell, IV | 400/100 |
| 6,922,664 | B1 * | 7/2005 | Fernandez et al. | 703/13 |
| 2002/0029341 | A1 * | 3/2002 | Juels et al. | 713/184 |
| 2002/0070844 | A1 * | 6/2002 | Davida et al. | 340/5.53 |
| 2002/0097142 | A1 | 7/2002 | Janiak et al. | |
| 2002/0126882 | A1 * | 9/2002 | Funahashi | 382/124 |
| 2003/0221877 | A1 | 12/2003 | Harrison | |
| 2004/0017300 | A1 * | 1/2004 | Kotzin et al. | 340/870.11 |
| 2005/0042014 | A1 | 2/2005 | Lahr | |
| 2006/0000894 | A1 * | 1/2006 | Bonalle et al. | 235/380 |
| 2006/0016877 | A1 * | 1/2006 | Bonalle et al. | 235/380 |

OTHER PUBLICATIONS

Fukumoto et al—1997—Body Coupled Fingering: Wireless Wearable Keyboard.
Ozvetco—K4000 USB Biometric Keyboard.
Infineon Technologies—Users Guide 1.70 (Status 12.99)—Microsystems for Biometrics—FingerTIP Software Package Software Development Kit (SDK) for FingerTIP.

* cited by examiner

*Primary Examiner*—David H Malzahn
(74) *Attorney, Agent, or Firm*—Trop, Pruner & Hu, P.C.

(57) ABSTRACT

A biometric keyboard or other input device, such as a keypad or touch screen, may be part of an input mechanism for inputting user information to a computing system. The mechanism may include biometric sensors associated with the buttons or keys of the input device. A mapping scheme may be used such that the input value forwarded to a processing resource when a user activates one or more of the buttons or keys varies depending on which digit (finger, toe, etc.) was used to activate the key(s) or button(s). Other embodiments are also described and claimed.

35 Claims, 8 Drawing Sheets

BIO-METRIC INPUT MECHANISM

BACKGROUND

1. Technical Field

The present disclosure relates generally to information processing systems and, more specifically, to a bio-metric input device such as a keyboard (such as those commonly used for input to a personal computing device), touchpad, keypad (such as that used on a telephone or an automatic teller machine), mouse, touch screen or the like.

2. Background Art

Common current personal computing and/or communicating devices, such as laptop or notebook computers, cell phones, calculators, personal digital assistants, or tablet or palm-held computers, for example, may include an input mechanism used by the system to communicate with a user. The display of a tablet computer, for example, may be touch-sensitive for interactive user input by a finger, stylus or pen-like device. A notebook, laptop, or PC may, on the other hand, accept interactive user input through a keyboard or a pointing device such as a mouse or a touch pad. For a cell-phone, input may be entered by a user via a keypad.

For keyboards, touchpads, keypads and other touch-based input mechanisms, keys or key combinations are commonly pre-mapped to represent certain data values. That is, the data value to be communicated to execution resources of the system may be pre-mapped such that touching a particular key or combination of keys will result in the sending of a pre-defined value to the execution resources. In addition to discrete values (such as an alphanumeric value associated with each key on a keyboard), the mappings may include function values. Where an operation or set of operations is performed frequently, a particular key or key combination (such as, for example, control-alt-delete) may be defined for the frequently-performed operation. The user knows that each button or set of buttons performs a predetermined function each time it is pressed.

In some cases, the key-to-value mapping for a key or set of keys may be configurable by the user. This is similar to some applications where the user may define 'shortcut' keys on a keyboard of a computing device to allow frequent operations to be performed without requiring several levels of menus.

The field of biometrics, or the measuring of a physical characteristic used to recognize the identity or verify the claimed identity of an individual, has emerged as an increasingly reliable methodology for verification (one-to-one) and identification (one-to-many) of individuals. The use of biometrics has become increasingly common to address problems associated with requiring positive identification of individuals. One type of biometrical characteristic is fingerprint information, which can be used to test and either confirm or reject a user's attempt to gain access to an appliance, a premises, etc.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of apparatuses, systems, and methods for a bio-metric input mechanism.

DETAILED DESCRIPTION

The following discussion describes selected embodiments of apparatuses, methods, and systems for a biometric keyboard or other input device. In the following description, numerous specific details such as specific button value mappings, number and configuration of buttons for example input mechanisms, and number of single- and multi-finger mappings for a particular button, etc., have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

Figure 1:
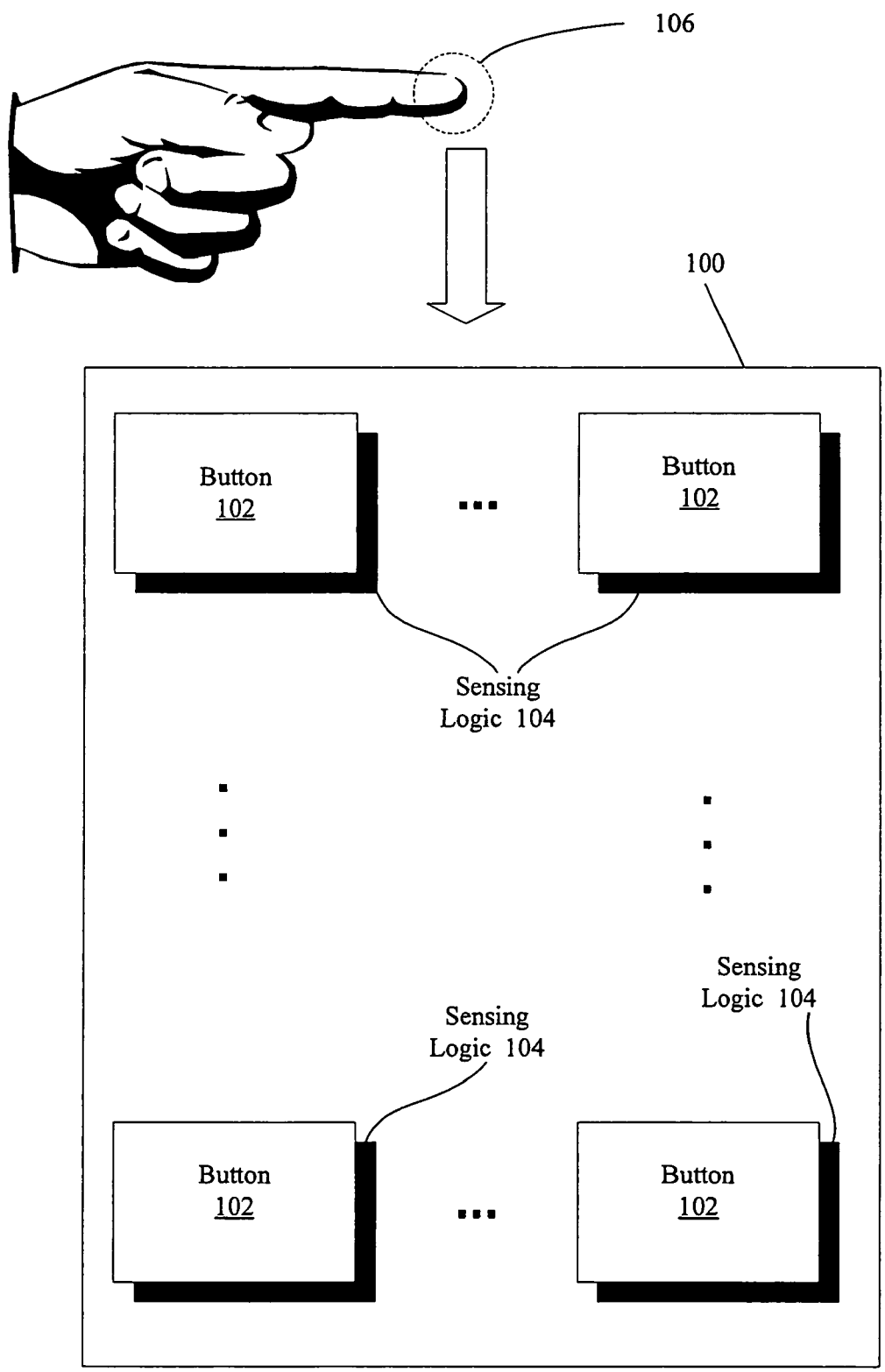
FIG. 1 is a block diagram of at least one embodiment of a biometric input mechanism that uses fingerprint information to determine the meaning of a button that has been depressed.

FIG. 1 is a block diagram illustrating at least one embodiment of a biometric input mechanism 100. The mechanism 100 includes one or more buttons 102. For each of the buttons 102, the mechanism includes associated sensing logic 104. At least one embodiment of the sensing logic 104 is capable of receiving biometric information regarding one or more digits (e.g., fingerprints 106 or toe prints) of a user. Rather than, or in addition to, being used for security purposes, the biometric information may be utilized to determine a value for a particular button 102 of the input mechanism 100.

Each button 102 may be a mechanical element such as any type of button or key found on common keyboards, keypads, automatic teller machines, personal digital assistants, and/or push-button phones, to name a few. Alternatively, the button 102 may be a two-dimensional graphical shape that is displayed on a touch screen. For other alternative embodiments, the buttons 102 may be any type of input mechanism that may receive a touch-type input from a user, such as a sensor worn on the fingertip of a user. For another alternative embodiment, the button may receive input based on motion, rather than touch. The buttons 102 for a particular embodiment of input mechanism 100 may any combination of these or other button types.

Regardless of the specific button type for buttons 102, the sensing logic 104 associated with a button 102 may receive biometric fingerprint information when the user places a fingertip onto or near the button 102. Alternatively, the sensing logic 104 associated with a button 102 may receive toe print or other biometric information of a user.

FIG. 1 illustrates a biometric input mechanism 100 having four or more buttons 102. Such illustrative example should not be taken to be limiting. Any number of buttons 102 may be utilized to practice the techniques disclosed herein. One of skill in the art will recognize, of course, that just one of many advantageous features of the techniques described herein is that a smaller number of keys may be used than for traditional input mechanisms in order to represent the same number of values. A single button 102 may be utilized to represent more than one single-finger input value, depending on which finger is utilized to activate the button 102.

Figure 2:
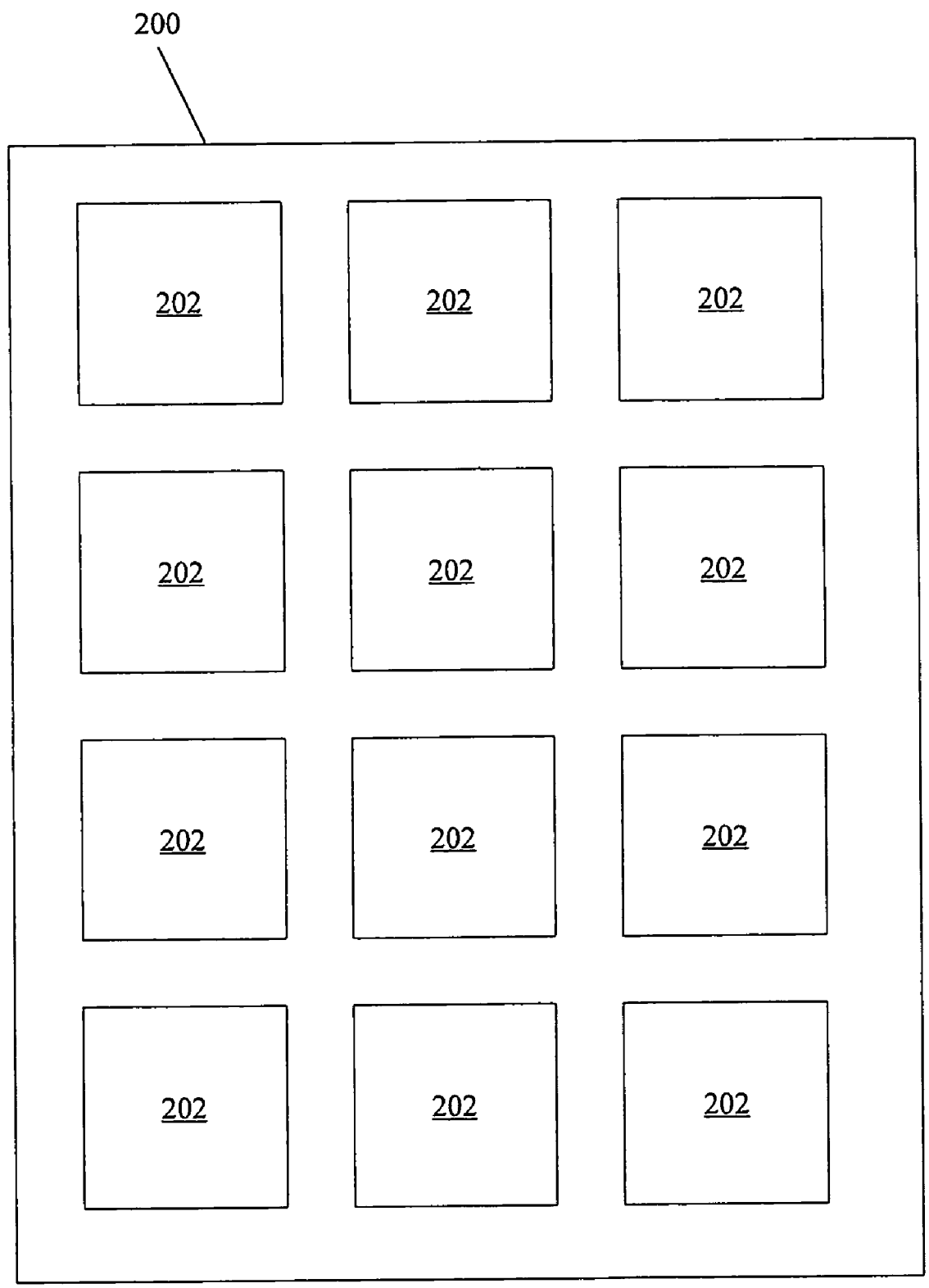
FIG. 2 is a block diagram illustrating at least one embodiment of a biometric input mechanism having a plurality of buttons, where each button may be mapped to a plurality of values, each of the mapped values corresponding to a different fingerprint.

FIG. 2 illustrates one sample embodiment of an input mechanism 200 having M buttons, where M=12. For such embodiment, a various number of values may be represented by the 12 buttons, depending on how many fingers are to be utilized to press the buttons. The mechanism 200 may be configured such that each of the M buttons 202 represents a different value for each of N fingertips. M and N may be any number greater than zero. M and N may be different values, as illustrated in FIG. 2, where M=12 and N=4. Alternatively M and N may be the same value (see, e.g., FIG. 3 where M=N=4).

Accordingly, for an embodiment of the mechanism 200 that has been configured for N=4 fingertips, each of the M,N pairs may be mapped to one of 48 single-finger values. For an embodiment of the mechanism 200 that has been configured for N=2 fingertips, each of the M,N pairs may be mapped to one of 24 single-finger values. In addition, each of the buttons 202 may also be mapped to one or more multi-finger values, described below.

Figure 3:
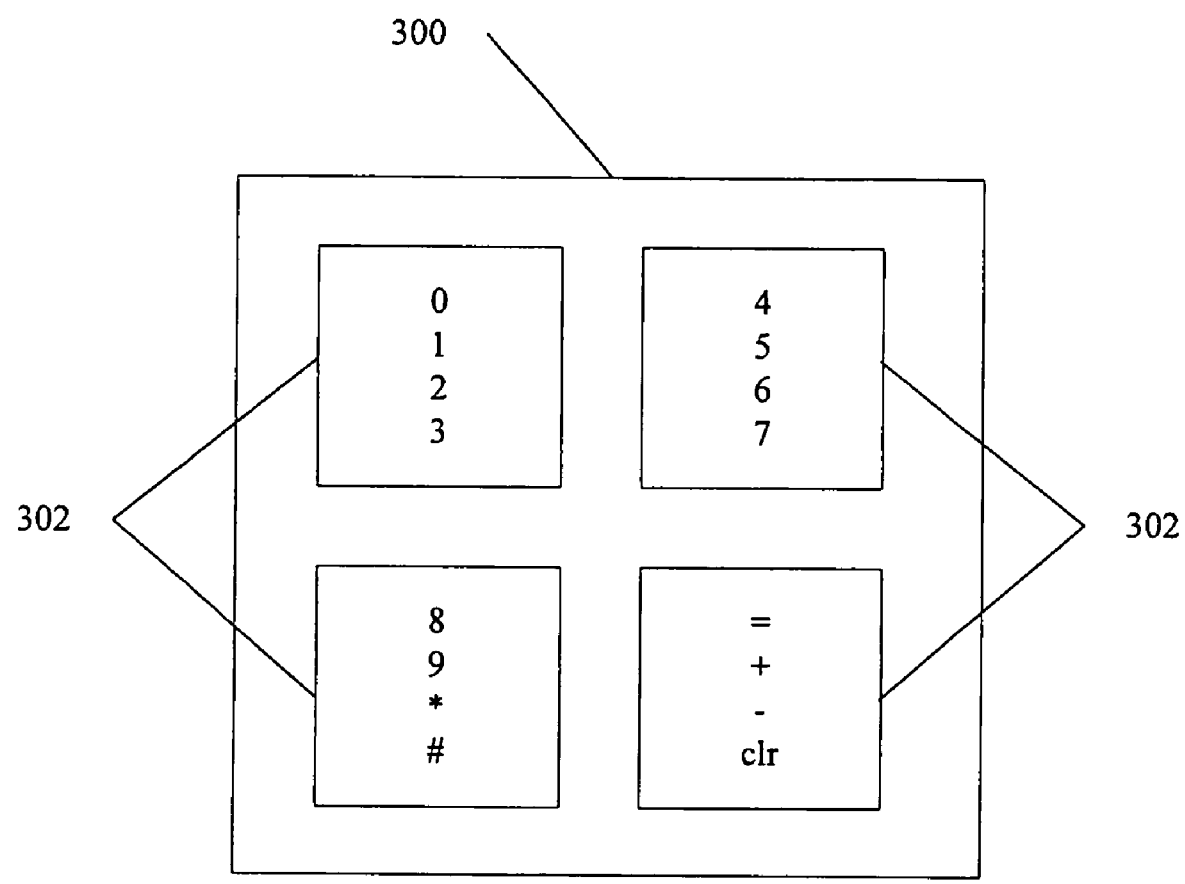
FIG. 3 is a block diagram illustrating at least one embodiment of a four-button biometric input mechanism, where each of the buttons may be mapped to four different values.

FIG. 3 illustrates at least one embodiment of a sample mechanism 300 that has been configured to map of each of four fingers (N=4) to four buttons (M=4) such that the keyboard may be utilized to represent N×M=16 unique single-finger entry values. A unique single-finger value may thus be mapped to each button, digit pair (that is, for each M,N pair). The value mappings for the buttons 302 may be stored in a mapping table (see, e.g., mapping table 680 shown in FIG. 6).

The contents of a sample mapping table are set forth in Table 1 for the illustrative example set forth in FIG. 3. One of skill in the art will recognize that Table 1 is provided merely as one illustrative example and in no way should be taken to be limiting. Alternative mappings to those illustrated in Table 1 may easily be implemented for a biometric input mechanism such as that illustrated in FIG. 3.

The values illustrated in Table 1 are based on a four-finger mapping scheme for a single hand. However, one-, two-, three-, or five-finger mapping schemes may also be utilized. Also, the mappings for alternative embodiments may utilize biometric information from either hand or from both hands. That is, for example, a four-finger mapping scheme may utilize one, two or three fingers of one hand along with one or more fingers of the other hand.

For certain types of physical impairments, it may be desirable to use other biometric information to perform mappings. For at least one embodiment, for example, toe prints may be utilized as a basis for the mappings, rather than (or in addition to) fingerprints. The mappings may thus take into account any combination of fingers and/or toes of one or both hands and feet of a user. As used herein, the term "digit" is used to refer to fingers, toes, eyes, or any other body part that may be utilized to activate an input device.

If it is desired that fingers or toes from both hands and/or feet may be utilized to activate the buttons of the mechanism 300, additional multi-digit mappings (such as six-, seven-, eight-, nine-, ten- . . . twenty-digit mappings) may also be defined for the input mechanism 300. In such case, up to 20 digits may be utilized for an alternative mapping scheme to that shown in Table 1.

TABLE 1

|  | Key 1 | Key 2 | Key 3 | Key 4 |
|---|---|---|---|---|
| Finger 1 | 0 | 4 | 8 | = |
| Finger 2 | 1 | 5 | 9 | + |
| Finger 3 | 2 | 6 | * | − |
| Finger 4 | 3 | 7 | # | clr |

Many alternative embodiments to that illustrated in FIG. 3 may be devised without departing from the scope of the appended claims. Additional or fewer buttons may be included in such alternative mechanisms. Also, additional or fewer digits may be utilized in alternative mechanisms. In addition, more or fewer values may be mapped to each key. Also, such a mechanism may also be programmed to map multi-key sequences to a particular value or function.

Figure 4:
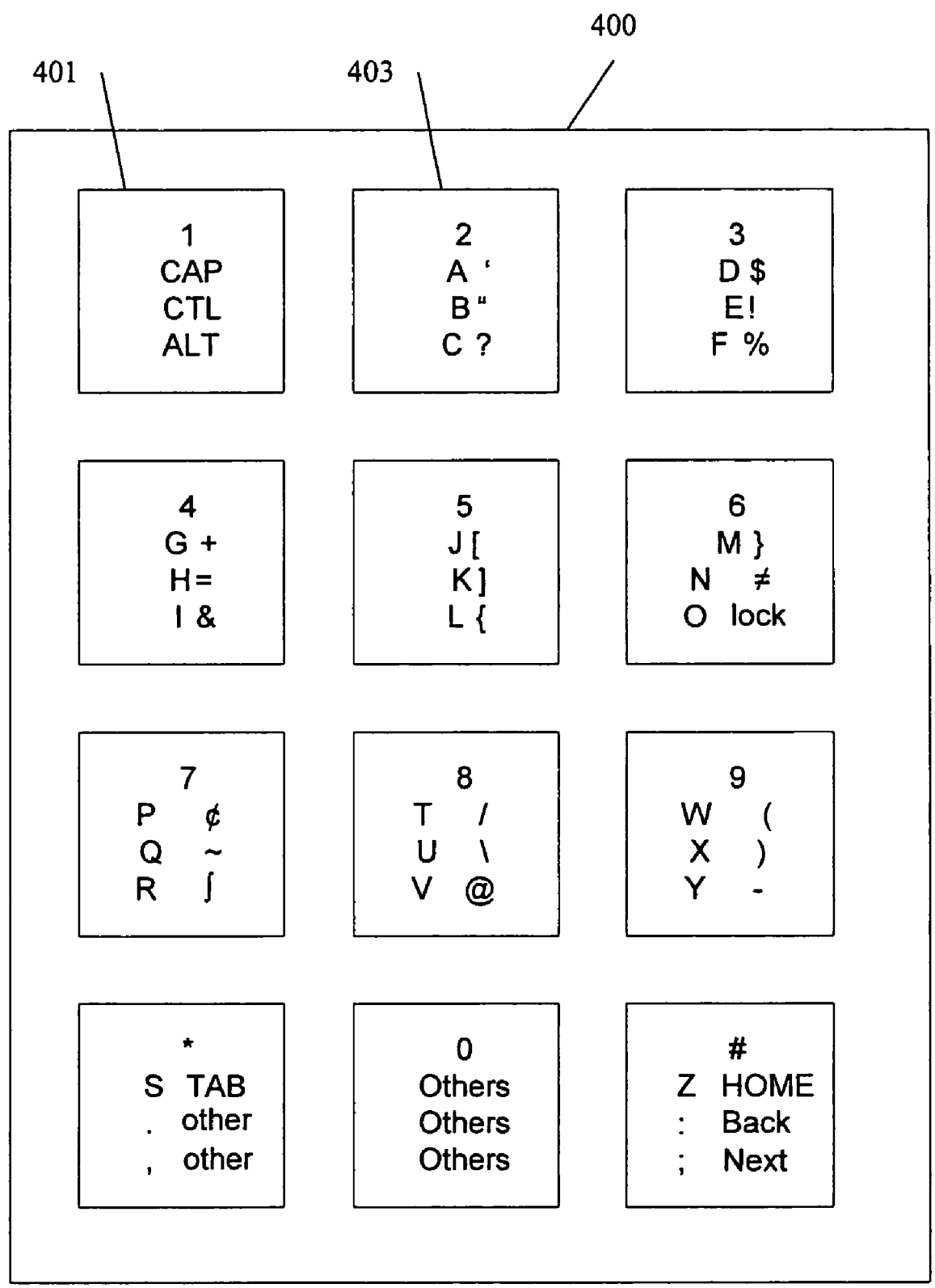
FIG. 4 is a block diagram illustrating at least one embodiment of a twelve-button biometric input mechanism, where each of the buttons may be mapped to multiple single-digit and multi-digit values.

FIG. 4 illustrates at least one alternative embodiment of the sample mechanism 300 illustrated in FIG. 3. The FIG. 4 mechanism 400 may be configured to map of each of four digits (N=4) to twelve buttons (M=12) such that the keyboard may be utilized to represent N×M=48 single-digit entry values. The example embodiment illustrated in FIG. 4 shows that these 48 single-digit entry values include numeric values 1-9 and 0, characters * and #, and lowercase alphabetic characters a-z, as well as the following punctuation marks: colon, semicolon, period, and comma. In addition, three of the 48 single-digit values are undefined (see "others" on middle button of bottom row), in order to allow for expansion and/or for user-defined sequences.

In addition, multi-digit entry values may also be defined. For example, FIG. 4 illustrates a first button 401 that may be mapped to four values, one for each of four digits. If pressed with a first digit, the button represents the numeric value of "1." If pressed with a second digit, the button represents a "Cap" key. If pressed with a third digit, the button represents a "Control" key. If pressed with a fourth digit, the button represents a "Function" key.

The "Function", "Cap", and "Control" keys may be used with other buttons to increase the number of mappings for the mechanism 400. For the example embodiment illustrated in FIG. 4, a user may press button 401 with a fourth digit to represent a "Function" key while concurrently pressing a second key 403 with a first digit to generate a first alternative function value, an apostrophe, for the second key 403. Similarly, a user may press button 401 with a fourth digit to represent the "Function" key while concurrently pressing a second key 403 with a second digit to generate a second alternative function value, a quotation mark, for the second key 403. Also, a user may press button 401 with a second digit to represent the "Cap" key while concurrently pressing a second key 403 to generate a value of capitalized "A". Otherwise, small-case "a" (a single-digit input value) may be generated by pressing the second key 403 with a second finger.

Although FIG. 4 is discussed herein with reference to only one- and two-digit combinations, additional combinations may also be implemented. For example, a three-digit combination akin to a "ctrl-alt-delete" combination may be mapped to a particular function such as a reset or shutdown signal. For example, the three-digit combination may map such function to a combination of concurrent activation of first button, first digit+second button, second digit+third button, third digit.

Figure 5:
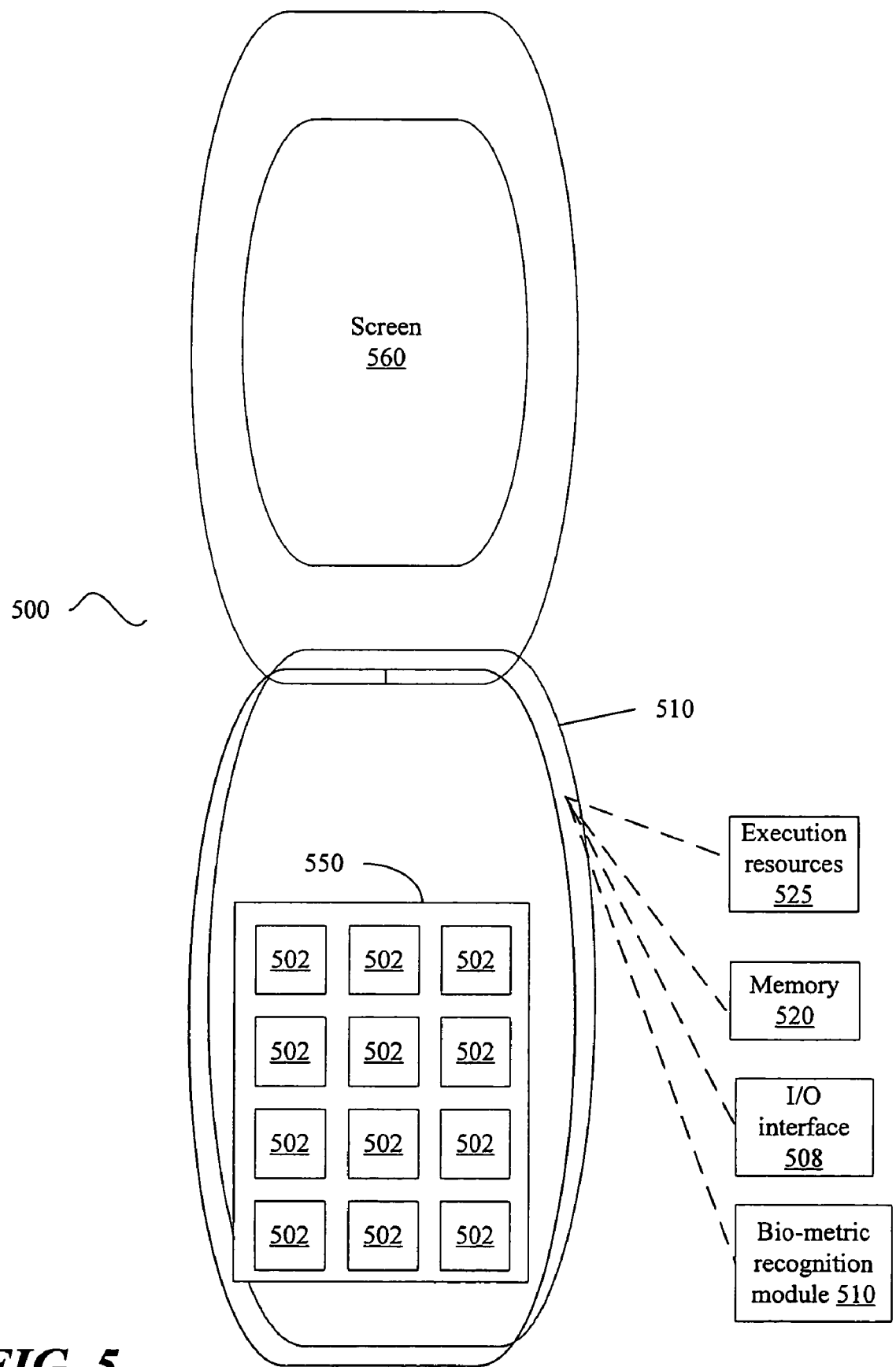
FIG. 5 is a block diagram of at least one embodiment of a computing device that includes a biometric input mechanism.

FIG. 5 is a block diagram illustrating at least one embodiment of a computing system 500 that includes a biometric input mechanism 550. The computing system 500 includes an exterior casing that may house internal components of the system 500. The casing 510 may a single-part or multi-part casing. For the embodiment 500 illustrated in FIG. 5, the casing is a two-part clamshell type of casing. For other embodiments, such as an automatic teller machine, the casing 510 may be a single-part casing.

For still other embodiments, such as a computing device to be operated by user having the use of only one side of the body or who otherwise desires to operating the input mechanism 550 with both hands and feet, the casing 510 may be a two-part casing where the two parts do not touch each other. A first part of the casing may include a first part of the input mechanism 550 and may be located within reach of a hand of the user. A second part of the casing may include a second part of the input mechanism 550 to be activated by one or more toes, and may be located within reach of the foot of the user. The two parts of the casing 510 for such embodiment may be communicably connected by one or more wires or cables.

The internal components of the system 500 may be housed within one or more portions of the casing 510. Such internal components may include a memory system 520 and execution resources 525. The internal components may also include an input-output interface 508 to receive information from the input mechanism 550. At least some of such information may be forwarded to a biometric recognition module 510. The biometric recognition module 510 may identify which user digit has been used to activate a button of the input mechanism 550. A mapping table, stored in the memory system 520, may then be utilized to determine the value mapped to the digit/button combination that has been activated by the user. Such value may then be forwarded to the execution resources 525 for further processing.

FIG. 5 illustrates that the system 500 may also include an out device, such as a display screen 560. The screen may be utilized to provide information to a user. For at least one alternative embodiment, the screen 560 may also be utilized, instead of a button-based input mechanism as illustrated in FIG. 5, to receive input from the user. In other words, the display screen 560 may be used as a touch screen and may therefore be used as an input mechanism for an alternative embodiment of the system 500.

Figure 6:
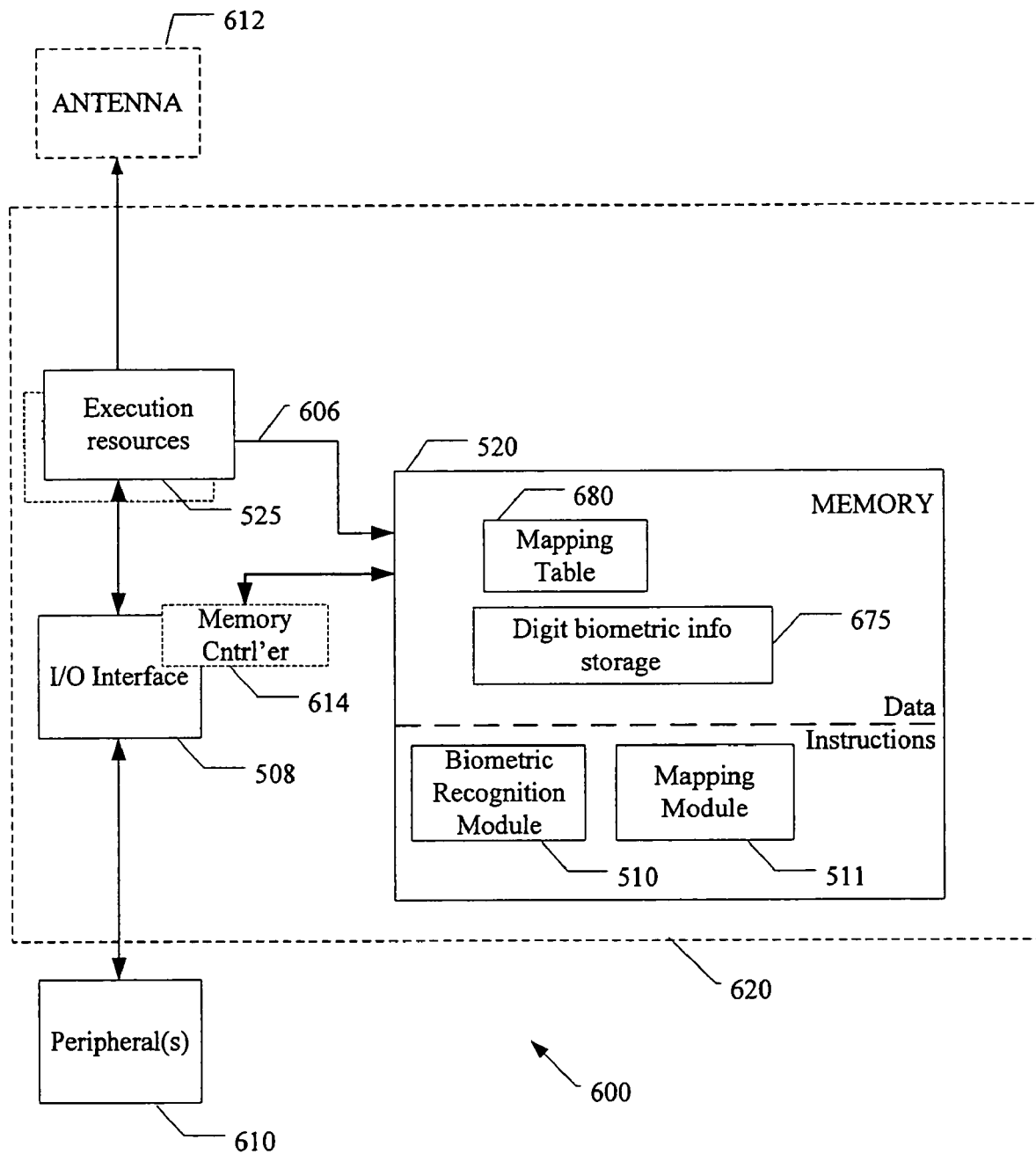
FIG. 6 is a block diagram illustrating at least one embodiment of a computing system that includes a peripheral biometric input device.

FIG. 6 is a block diagram illustrating further details for at least one embodiment of components that may be included in a system 600 that includes a biometric input device. Computing system 600 is intended to represent any number of wired and wireless computing and communication systems and consumer devices, including, but not limited to, mainframes, minicomputers, servers, workstations, personal computers, notepads, personal digital assistants, consumer electronics and various wireless communication devices (such as cell phones, smart phones, pagers, remote controls, wireless email devices and other wireless handheld devices) that may include one or more optional antenna(e) 612 and/or embedded systems, just to name a few. The optional nature of the antenna(e) 612 is denoted in FIG. 6 with broken lines.

FIG. 6 illustrates that a processing system 600 may include various components including execution resources 525, a memory system 520, and at least one peripheral interface 508 to provide input/output ("I/O") control functions for at least one peripheral device 610. The peripheral device 610 may be a biometric input device such as those 100, 200, 300, 400, 550 illustrated in FIGS. 1-5.

The system 600 illustrated in FIG. 6 may be an embodiment of a system-on-a-chip ("SOC"), wherein various components of a computing system, which perform separate tasks, are integrated into a single chip package 620.

One of skill in the art will recognize, of course, that components of processing system 600 need not necessarily be incorporated into a single chip package 620 in order to comport with the scope of the appended claims. Embodiments of the invention disclosed herein may be incorporated into SOC systems and/or multi-chip systems. Accordingly, the single chip package 620 illustrated in FIG. 6 is an optional feature. The optional nature of such feature is denoted with broken lines in FIG. 6.

One of skill in the art will also recognize that the sample embodiment 600 illustrated in FIG. 6 is merely one illustrative example. Many other components, such as one or more additional processing core(s), additional memory (flash, RAM and/or ROM), universal asynchronous receiver-transmitters ("UARTs"), parallel ports, DMA (direct memory access) controllers, accelerators, modems, etc. may be included in a system without departing from embodiments encompassed by the appended claims.

The components of a processing system 600 may be laid out in a planar fashion (as shown), may be stacked, or may be organized as any combination of layout approaches. The execution resources 525 may include one or more processor cores. For a multi-core embodiment, each processor core of the execution resources 525 need not be symmetric, in terms of size, power, functionality, etc., with the other cores of the system 600. The optional nature of additional processor cores of the execution resources 525 is denoted in FIG. 6 by broken lines for optional processor core(s).

FIG. 6 illustrates that the execution resources 525 may issue commands and data to memory system 520 over communication pathway 606. Communication pathway 606, as well as any other communication pathways of embodiments of the system 600 illustrated in FIG. 6, may be a multi-drop bus. Alternatively, communication pathway 606, and any other communication pathways of the embodiment 600 illustrated in FIG. 6 may be a point-to-point interconnect. Any combination of multi-drop buses and point-to-point interconnects may be utilized in embodiments of the system 600.

The memory system 520 may be associated with an integrated memory controller residing in the chip package 620, or may be accessed via a separate, non-integrated memory controller that does not reside on the chip package 620. For at least one embodiment, a single module (such as a chipset or memory-I/O hub) may provide memory controller functionality as well as providing the I/O interface 608. The dotted lines and placement for memory controller 614 illustrated in FIG. 6 indicate that the memory controller 614 may be integrated with the I/O interface module 508, or may be separate from the I/O interface module 508. In the case that the memory controller 614 is separate from the I/O interface module 508, it may be integrated into a processor core of the execution resources 525, may be integrated into the memory system 520, may be a non-integrated memory controller that resides outside the chip package 620, or may be integrated into the chip package 620 as shown in FIG. 4.

Memory system 520 may include, for example, FLASH memory, EEPROM, EPROM, ROM, ferromagnetic digital memory, phase-change memory, polymer memory, RAM, DRAM, SRAM, and/or the like. FIG. 6 illustrates that memory system 520 may include storage for both data and instructions. Regarding data, the memory system may include storage 675 for biometric information for one or more digits. The biometric data stored in the storage 675 for biometric digit information may be entered by the user via activation of one or more buttons of the biometric input device (see peripheral 610).

The memory system 520 may also include storage for a mapping table 680. Regarding instructions, for at least one embodiment, for example, the memory system 520 may include a mapping module 511. In addition, the memory system 520 may also include a biometric recognition module 510.

The mapping module 510 is discussed in further detail below in connection with FIG. 8. The biometric recognition module 510 is further discussed here with brief reference to FIG. 1 as well. At least one embodiment of the biometric recognition module 510 receives and processes biometric digit information, such as fingerprint or toe print data. When a user presses a button of the biometric input device with a fingertip or other digit, sensing logic 104 associated with the button 102 is capable of receiving biometric fingerprint data regarding the digit that was used to press the button 102. The data may be forwarded to the biometric recognition module 510 (perhaps via the I/O interface module 508), where the digit data may be processed. For initialization processing, the digit information may be identified and stored in a storage location 675. For later processing, the information may be used to identify the digit in order to accurately access the mapping table 680 in order to determine the appropriate value for the digit/button combination activated by the user.

In FIG. 6, the biometric recognition module 510 and the mapping module 511 are shown as being stored in the memory system 520. As such, the modules 510, 511 represent machine-accessible signals, such as software instructions, that, when executed by a processor core or other execution resources 525, cause the execution resources 525 to perform desired actions. However, one of skill in the art will recognize that such modules 510, 511 need not exist as software instructions in the memory system 520. For at least one embodiment, for example, the modules 510, 511 may be hardware modules. Alternatively, the desired actions may be performed partly in hardware and partly in software, may be performed as firmware instructions, such as those associated with microcode ROM, or may be exist as any combination of such approaches.

Sample system 600 is representative of processing systems based on Intel XScale® core, Intel® Micro Signal Architecture (Intel® MSA), Intel® PCA Cellular Processors, and/or Pentium®, Pentium® Pro, Pentium® II, Pentium® III, Pentium® 4, and Itanium® and Itanium® 2 microprocessors available from Intel Corporation, although other systems (including personal computers (PCs), cellular telephones, walkie-talkies, personal digital assistants and other hand-held devices having other microprocessors, engineering workstations, set-top boxes and the like) may also be used.

Figure 7:
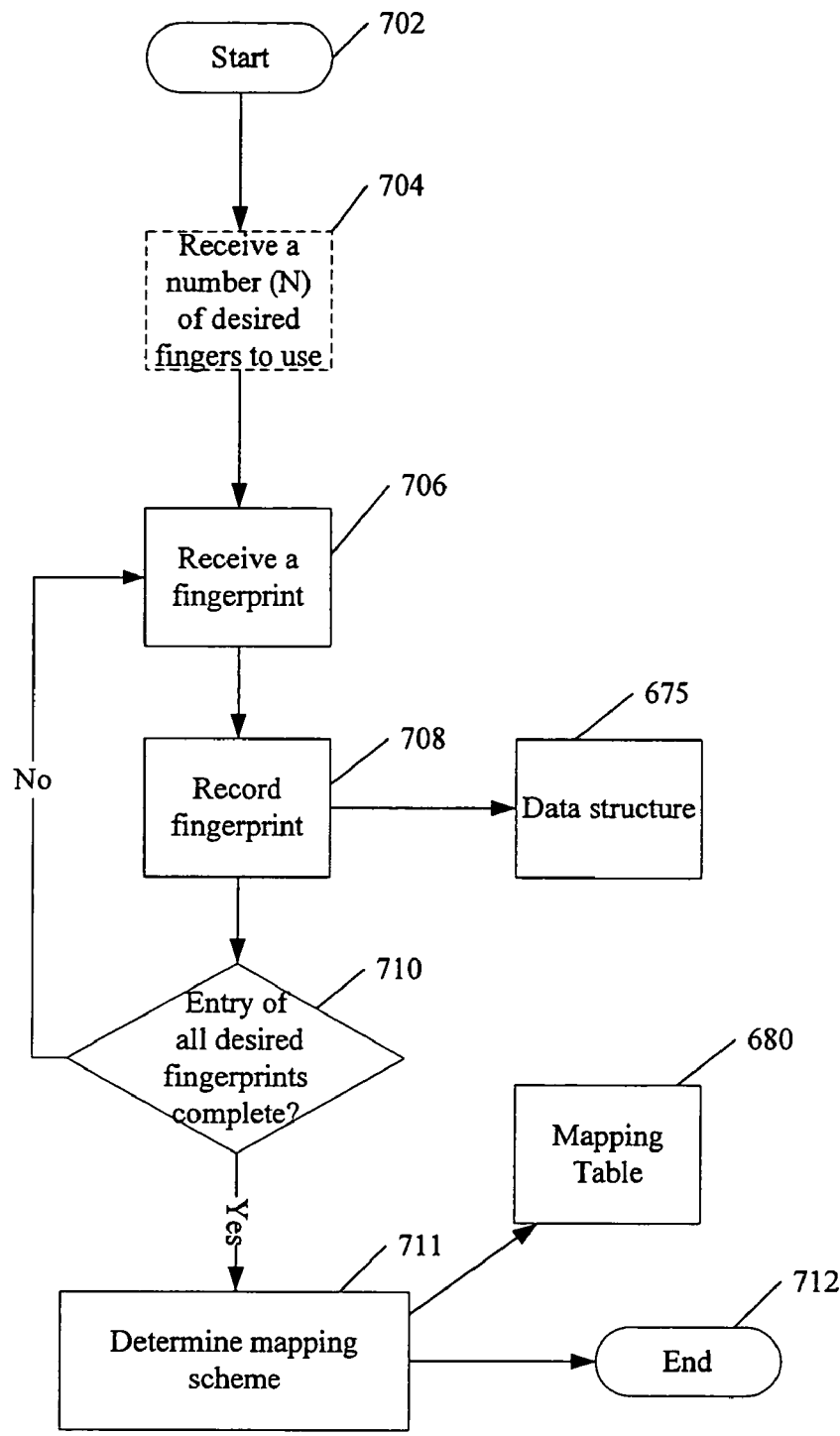
FIG. 7 is a flowchart illustrating at least one embodiment of a method for mapping multiple input values to a single button on an input device, based on biometric information.

FIG. 7 is a flowchart illustrating at least one embodiment of a method 700 for mapping multiple input values to a single button on an input device, based on biometric digit information. An embodiment of the FIG. 7 method 700 may be utilized with any embodiment of the input devices 100, 200, 300, 400 illustrated in FIGS. 1-4.

The method 700 may be performed by initialization logic stored in a memory system, such as memory system 520 illustrated in FIG. 6. The initialization logic may invoke other logic during execution of the method 700. For example, portions of the method 700 may be performed, for at least one embodiment, by a biometric recognition module 510 of a system such as that illustrated in FIG. 6.

FIG. 7 illustrates that the method 700 begins at block 702 and proceeds to block 704. At block 704, the initialization logic optionally determines the number of digits to be utilized in the mapping scheme. That such processing 704 is optional is denoted by dotted lines in FIG. 7. The determination at FIG. 704 may be made in response to activation of a particular button on the input mechanism. For example, default mappings that represent numeric values may be in place when the method 700 begins execution, such that activation of a particular button at block 704 represents a numeric value. From optional block 704, processing proceeds to block 706.

At block 706, the biometric recognition module (see, e.g., block 510 of FIG. 6) may be invoked to receive biometric information. For at least one embodiment, the information received at block 706 may be received from sensing logic, such as sensing logic 104 illustrated in FIG. 1. In accordance with one aspect of the invention, the sensing logic 104 may include a fingerprint sensor for reading a fingerprint and generating the fingerprint data received at block 706.

The biometric information received at block 706 may be processed in order to assign an identifier to the data and to otherwise process the data so that future matching operations may be performed efficiently. Processing then proceeds to block 708.

At block 708, the method 700 may store identifying information for the received data in a storage area 675. FIG. 7 thus illustrates that each fingerprint (or other piece of biometric data) may be stored in the storage area 675. For at least one embodiment, the biometric information received at block 706 and stored at block 708 is fingerprint information. Such information may be later utilized to identify a particular finger of the user. That is, the information in such data structure 675 may be utilized by a mapping module (see, e.g., mapping module 511 of FIG. 6) to determine an input value associated with a button any time the button is activated by a user. Such processing is discussed further below in connection with FIG. 8.

Processing then proceeds to block 710. At block 710, it is determined whether the entry of all biometric information is complete. For the embodiment illustrated in FIG. 7, it is determined at block 710 whether entry of all N fingerprint data is complete. For at least one embodiment, the determination made at block 710 is performed by comparing the number of fingerprints for which data has already been received against the number (N) previously entered by the user at optional block 704, discussed above. For at least one other embodiment, the determination is made at block 710 by prompting the user to indicate whether entry of biometric data is complete. For at least one embodiment, for example, the method may cause a message such as "More?" to be displayed to the user. If the user indicates that more biometric data is to be entered, then it is determined at block 710 that the entry process is not complete.

If it is determined at block 710 that all biometric data (e.g., all N fingerprints) has been entered, then processing proceeds to block 711. Otherwise, processing loops back to block 706 in order to process additional biometric data.

At block 711, a mapping scheme, utilizing the N digits entered by the user during the preceding portion of the method 700, is determined. It should be noted that the mapping scheme determined at block 711 may include only single-digit mappings or may also include multi-digit mappings as well.

For at least one embodiment, a series of mapping schemes is pre-determined. At block 711, one of the pre-determined mapping schemes is selected, based on the number, N, of digits entered during one or more iterations of blocks 706-710 of the method 700. For the predetermined scheme, the appropriate values are loaded into the mapping table 680 at block 711. Alternatively, a pointer to an appropriate pre-existing mapping table 680 is loaded into a key location (such as a variable, a register, etc.) at block 711.

For at least one alternative embodiment, a user may customize the mapping scheme at block 711 by entering selected digit-button combinations for every desired mapping value. From block 711, processing ends at block 712.

Figure 8:
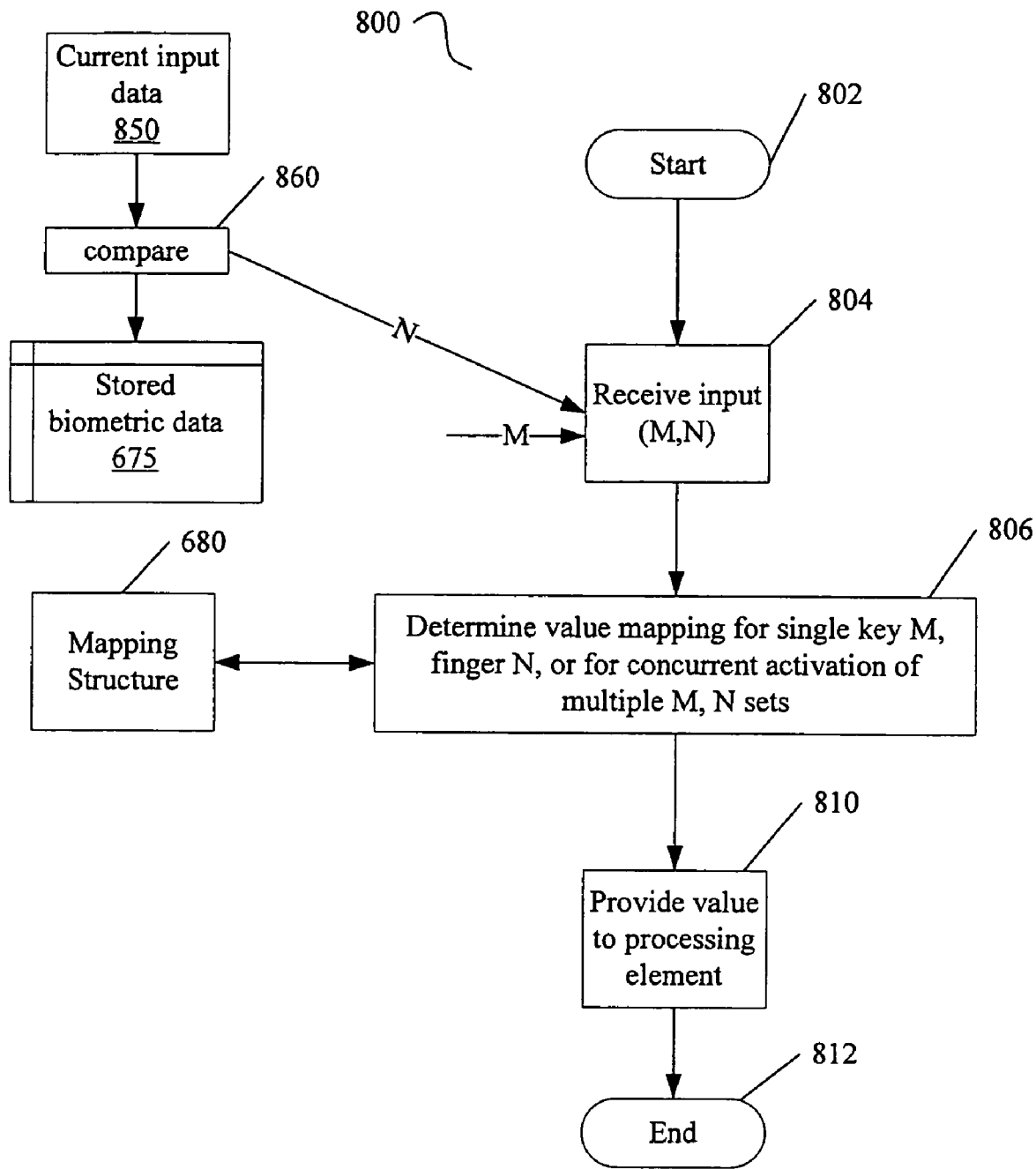
FIG. 8 is a flowchart illustrating at least one embodiment of a method for utilizing a biometric input mechanism to provide user input to a processing element of a program or system.

FIG. 8 is a flowchart illustrating at least one embodiment of a method 800 for determining an input value, based on user activation of one or more buttons on a biometric input mechanism. The method 800 may be performed, for at least one embodiment, by a mapping module such as mapping module 511 illustrated in FIG. 6.

FIG. 8 illustrates that the method 800 begins at block 802 and proceeds to block 804. At block 804, the method receives data indicating which of M buttons of the input mechanism have been activated. Such data may be supplied from the input mechanism via an I/O interface module (see, e.g., 508 of FIG. 6). The method contemplates that either 1) a single button has been activated or 2) multiple of the M buttons have been activated concurrently. In the latter case, for at least one embodiment it is presumed that each of the concurrently-activated buttons has been activated by a different digit.

The method also receives at block 804 data indicating which of N digits the user utilized to activate the button(s). For at least one embodiment, the data indicating which of N fingers was utilized for each button is determined by comparing incoming current biometric data 850 from the sensing logic (see 104, FIG. 1) with the stored biometric data 675. For at least one embodiment, the comparison 860 may be performed by a biometric recognition module (see, e.g., 510 of FIG. 6).

For an embodiment that supports multi-finger mappings, a plurality of M,N sets may be received at block 804. For example, for a three-finger analog to "ctrl-alt-delete," three M,N data pairs may be received at block 804.

Processing then proceeds to block 806. At block 806, the (M,N) set(s) of data received at block 806 are utilized to perform a lookup in a mapping structure 880. The mapping structure 880 includes a mapping table (see, e.g., 680 of FIG. 6), similar to that illustrated above in Table 1, that indicates particular single-digit (and, for some alternative embodiments, multi-digit) mapping values for the buttons of the input mechanism. For at least one embodiment, the mapping table in the mapping structure 880 includes pre-programmed values for each of the button or button combinations. The mapping structure 880 may, for example, include several mapping tables, one for each of the permissible values of N. That is, if a system is configured to allow a user to select from several values of N, the mapping structure 880 may include a mapping table for each of the N values. A pointer to the relevant portion of the mapping structure 880, based on the current value of N, may be maintained in order to facilitate the lookup at block 806.

Alternatively, the user may configure (via processing not specifically illustrated in the figures) his own mapping of the values for each of N fingers for each of M buttons.

Whether the mappings for the buttons is pre-defined or user-configurable, certain buttons may be user-configured to represent certain operations. Such may the case, for example, for systems that allow a user to define the meaning for one or more "short cut" buttons. These user-defined mappings may also be stored in the mapping structure 880 prior to execution of the method 800.

The value determined at block 806 is forwarded to a processing element of the system at block 810. The value may be utilized by a program, which is being executed by one or more processing elements, to perform an operation desired by the user. Processing then ends at block 812.

The techniques discussed above may be utilized with any computing device or system that includes a digit-activated peripheral data input device. Examples of such computing devices or systems include automatic teller machines, hand-held, laptop, or notebook computers, cell phones, personal digital assistants, computerized communication devices for the disabled, consumer electronics, remote controls, hand-held wireless email devices, pagers, and the like.

For at least some such devices or systems, a particular user may most often need to interact with the device while holding the device in one hand. Accordingly, only one hand is conveniently available to provide input to the device. Many such systems and devices have moved towards having as few as keys as possible for form factor and design simplicity reasons. By mapping the meaning of a key or button based on which finger was used to activate it, a larger number of input values may be mapped to a relatively small number of keys-buttons.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While particular embodiments of the present invention have been shown and described, it will be obvious to those skilled in the art that changes and modifications can be made without departing from the scope of the appended claims. For example, the biometric input device and the associated mapping actions described herein may be advantageously applied to automatic teller machines or other personal banking systems. For example, a password for such machines may take biometric information into account when determining if a password is successfully entered. That is, a user may set a password such that each number of the password must be pushed with a particular one of the user's fingers. Some users may prefer not to provide a full set of biometric information to the banking institution. For embodiments of the present invention, this is not required. For example, the banking institution's software may know that at least one or two numbers of the password must be pressed with a particular finger. One advantageous feature of such embodiment is that at least some of the information about the password is maintained by the banking institution, not by the user. In contrast, some common security technologies, such as smart cards, require that the security information is carried by the user.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. An apparatus, comprising:
an input mechanism to receive input from a user based on user activation of the mechanism with one or more digits of the user's body;
a recognition module to identify which digit of a plurality of identifiable digits was used to activate the mechanism; and
a mapping module to determine an input value, based on the identified digit.

2. The apparatus of claim 1, wherein:
the mapping module is further to forward the value to an execution resource.

3. The apparatus of claim 1, wherein the input mechanism further comprises:
M elements that may be activated by the user.

4. The apparatus of claim 3, wherein:
each of the M elements is a button.

5. The apparatus of claim 3, wherein:
each of the M elements is a graphically-displayed area of a touch screen.

6. The apparatus of claim 3, wherein the input mechanism further comprises:
a biometric sensor for each of the M elements.

7. The apparatus of claim 1, wherein:
the input mechanism is a keypad.

8. The apparatus of claim 1, wherein:
the input mechanism is a keyboard.

9. The apparatus of claim 1, wherein:
the recognition module is further to identify a second digit used to activate the input mechanism.

10. The apparatus of claim 9, wherein:
the mapping module is further to determine the input value based on both the digit and the second digit.

11. The apparatus of claim 1, wherein the input mechanism further comprises:
one or more biometric sensors.

12. A method, comprising:
receiving biometric data from a sensor associated with a button of an input device;
identifying a digit of a plurality of identifiable human digits sensed by said sensor based on the biometric data; and
determining a unique input value for the button, digit pair.

13. The method of claim 12, further comprising:
forwarding the input value to an execution resource.

14. The method of claim 13, wherein:
the execution resource is a processor core.

15. The method of claim 12, wherein determining an input value further comprises:
performing a lockup in a mapping table.

16. The method of claim 12, wherein:
the input device further comprises a plurality of M buttons.

17. The method of claim 12, wherein:
said determining a unique input value further comprises selecting from among at least N values for the button, where N represents a number of user digits.

18. The method of claim 17, wherein:
N further represents a number of user fingers.

19. An article comprising a computer readable storage medium storing a plurality of machine accessible instructions, wherein, when the instructions are executed by a processor, the instructions provide for:
receiving biometric data from a sensor associated with a button of an input device;
identifying a digit of a plurality of identifiable human digits sensed by said sensor based on the biometric data; and
determining an input value associated with the button, based on the digit identity.

20. The article of claim 19, wherein the instructions further provide for, when executed by the processor:
forwarding the input value to an execution resource.

21. The article of claim 19, wherein the instructions that provide for determining an input value further comprise instructions that provide for:
performing a lookup in a mapping table.

22. The article of claim 19, wherein the instructions that provide for determining an input value further comprise instructions that provide for:
selecting from among at least N values for the button, where N represents a number of user digits.

23. The article of claim 22, wherein:
further represents a number of user fingers.

24. A system, comprising:
an input device having M buttons capable of activation by one or more user digits;
an execution resource coupled to the input device; and
a memory system coupled to the execution resource;
wherein said memory system is to store one or more instructions that provide for identifying one or more user digits that have been used to activate one or more of the M buttons; and
wherein said memory system is further to store one or more instructions that provide for determining an input value based on the one or more identified digits and the one or more activated buttons.

25. The system of claim 24, further comprising:
an output device coupled to the execution resource.

26. The system of claim 25, wherein:
said output device is a display screen.

27. The system of claim 24, further comprising:
an antenna coupled to the execution resource.

28. The system of claim 24, wherein:
said memory system is further to store one or more instructions for receiving and storing biometric data for one or more user digits.

29. The system of claim 24, wherein:
said memory system is further to store one or more mapping tables to map input values to digit/button pairs.

30. The system of claim 24, wherein:
said memory system further comprises a DRAM.

31. The system of claim 24, wherein:
said input device is a key pad.

32. The system of claim 24, wherein:
said input device is a keyboard.

33. The system of claim 24, wherein:
said input device is a touch screen.

34. The system of claim 24, further comprising:
a casing, wherein said casing houses said execution resource and said memory system.

35. The system of claim 24, further comprising:
a two-part clamshell casing, wherein a first portion of said casing houses said execution resource and said memory system; and
wherein a second part of said casing bears the output device, the output device being a display screen.

* * * * *